(12) United States Patent
Fry et al.

(10) Patent No.: US 11,087,502 B2
(45) Date of Patent: Aug. 10, 2021

(54) MULTIMODAL DATA VISUALIZATION USING BANDWIDTH PROFILES AND OPTIONAL ENVIRONMENTAL COMPENSATION

(71) Applicant: INTERNATIONAL BUSINESS MACHINES CORPORATION, Armonk, NY (US)

(72) Inventors: Jonathan Fry, Fishkill, NY (US); Victoria A. Nwobodo, Poughkeepsie, NY (US); Kam Hou U, Brooklyn, NY (US); Michael Lapointe, Saugerties, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 38 days.

(21) Appl. No.: 16/176,680

(22) Filed: Oct. 31, 2018

(65) Prior Publication Data
US 2020/0134878 A1   Apr. 30, 2020

(51) Int. Cl.
*G06T 11/00* (2006.01)
*G06T 11/20* (2006.01)
*G06F 3/0484* (2013.01)

(52) U.S. Cl.
CPC ........ *G06T 11/001* (2013.01); *G06F 3/04842* (2013.01); *G06T 11/20* (2013.01); *G06T 2200/24* (2013.01)

(58) Field of Classification Search
None
See application file for complete search history.

(56) References Cited

U.S. PATENT DOCUMENTS

| | | | |
|---|---|---|---|
| 8,706,500 B2 | 4/2014 | Cross, Jr. | |
| 9,343,064 B2 | 5/2016 | Cross, Jr. | |
| 9,646,589 B2* | 5/2017 | Ludwig | G06F 3/167 |
| 2006/0280360 A1* | 12/2006 | Holub | G01J 3/02 |
| | | | 382/162 |
| 2008/0150937 A1* | 6/2008 | Lundstrom | G06T 15/005 |
| | | | 345/419 |

(Continued)

OTHER PUBLICATIONS

Dos Anjos Duarte, Carlos Alberto Pacheco, "Design and Evaluation of Adaptive Multimodal Systems," Dissertation, Universidade de Lisboa, 2007. 238 pages.

(Continued)

*Primary Examiner* — James A Thompson
(74) *Attorney, Agent, or Firm* — Cantor Colburn LLP; Edward Wixted

(57) ABSTRACT

A computer-implemented method includes receiving a base visualization having first data in a first set of channels, where each channel in the first set of channels is associated with a respective range in the base visualization. It is detected that the respective ranges of the first set of channels fall outside a perceptual bandwidth of a first user. The base visualization is automatically transformed to a second visualization, based on the perceptual bandwidth of the first user. The second visualization includes second data in a second set of channels, where each channel in the second set of channels is associated with a respective range in the second visualization. The respective ranges of the second set of channels fall within the perceptual bandwidth of the first user.

20 Claims, 8 Drawing Sheets

(56) References Cited

U.S. PATENT DOCUMENTS

| | | | |
|---|---|---|---|
| 2009/0096807 A1* | 4/2009 | Silverstein | G06T 11/001 345/593 |
| 2009/0287814 A1* | 11/2009 | Robertson | G06Q 10/10 709/224 |
| 2011/0308376 A1* | 12/2011 | Ludwig | G06F 3/167 84/604 |
| 2012/0072289 A1 | 3/2012 | Pradeep | |
| 2012/0109868 A1 | 5/2012 | Murillo | |
| 2014/0309868 A1 | 10/2014 | Ricci | |
| 2015/0201889 A1* | 7/2015 | Roginska | A61B 5/4064 600/407 |
| 2016/0358584 A1* | 12/2016 | Greenebaum | G06T 1/20 |
| 2017/0293356 A1 | 10/2017 | Khaderi | |
| 2019/0051276 A1* | 2/2019 | Lathrop | G10G 1/02 |
| 2019/0147658 A1* | 5/2019 | Kurabayashi | G06T 7/90 345/423 |
| 2019/0235737 A1* | 8/2019 | Kuribayashi | G03H 1/0406 |
| 2019/0272079 A1* | 9/2019 | Woodward | G06T 19/003 |

OTHER PUBLICATIONS

Rico et al., "Personalized Handling of Semantic Data with MIG," 20th International Workshop on Database and Expert Systems Application, IEEE Computer Society, IEEE, 2009, pp. 64-68.

* cited by examiner

MULTIMODAL DATA VISUALIZATION USING BANDWIDTH PROFILES AND OPTIONAL ENVIRONMENTAL COMPENSATION

BACKGROUND

The present invention relates to data visualization and, more specifically, to multimodal data visualization using bandwidth profiles and optional environmental compensation.

The human brain can manage a great deal of information, and often, fully understanding information can enable a person to make better decisions. In many cases, humans can better understand data when it is presented in a format other than raw numerical data. For instance, a graph may be more useful to some than a table of numbers. On computing devices, data visualization is generally in the form of audio, graphical, or video, and recently, haptic feedback has become popular on mobile devices.

User interfaces, infographics, or other data visualizations are typically created by one or more designers and will likely be used by multiple users. Due to the variance is perceptual bandwidths, each designer and user will perceive a visualization differently.

SUMMARY

Embodiments of the present invention are directed to a computer-implemented method for generating a visualization for a user. A non-limiting example of the computer-implemented method includes receiving a base visualization having first data in a first set of channels, where each channel in the first set of channels is associated with a respective range in the base visualization. It is detected that the respective ranges of the first set of channels fall outside a perceptual bandwidth of a first user. The base visualization is automatically transformed to a second visualization, based on the perceptual bandwidth of the first user. The second visualization includes second data in a second set of channels, where each channel in the second set of channels is associated with a respective range in the second visualization. The respective ranges of the second set of channels fall within the perceptual bandwidth of the first user.

Embodiments of the present invention are directed to a system for generating a visualization for a user. A non-limiting example of the system includes a memory having computer-readable instructions and one or more processors for executing the computer-readable instructions. The computer-readable instructions include receiving a base visualization having first data in a first set of channels, where each channel in the first set of channels is associated with a respective range in the base visualization. Further according to the computer-readable instructions, it is detected that the respective ranges of the first set of channels fall outside a perceptual bandwidth of a first user. The base visualization is automatically transformed to a second visualization, based on the perceptual bandwidth of the first user. The second visualization includes second data in a second set of channels, where each channel in the second set of channels is associated with a respective range in the second visualization. The respective ranges of the second set of channels fall within the perceptual bandwidth of the first user.

Embodiments of the invention are directed to a computer-program product for generating a visualization for a user, the computer-program product including a computer-readable storage medium having program instructions embodied therewith. The program instructions are executable by a processor to cause the processor to perform a method. A non-limiting example of the method includes receiving a base visualization having first data in a first set of channels, where each channel in the first set of channels is associated with a respective range in the base visualization. Further according to the method performed by the processor, it is detected that the respective ranges of the first set of channels fall outside a perceptual bandwidth of a first user. The base visualization is automatically transformed to a second visualization, based on the perceptual bandwidth of the first user. The second visualization includes second data in a second set of channels, where each channel in the second set of channels is associated with a respective range in the second visualization. The respective ranges of the second set of channels fall within the perceptual bandwidth of the first user.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
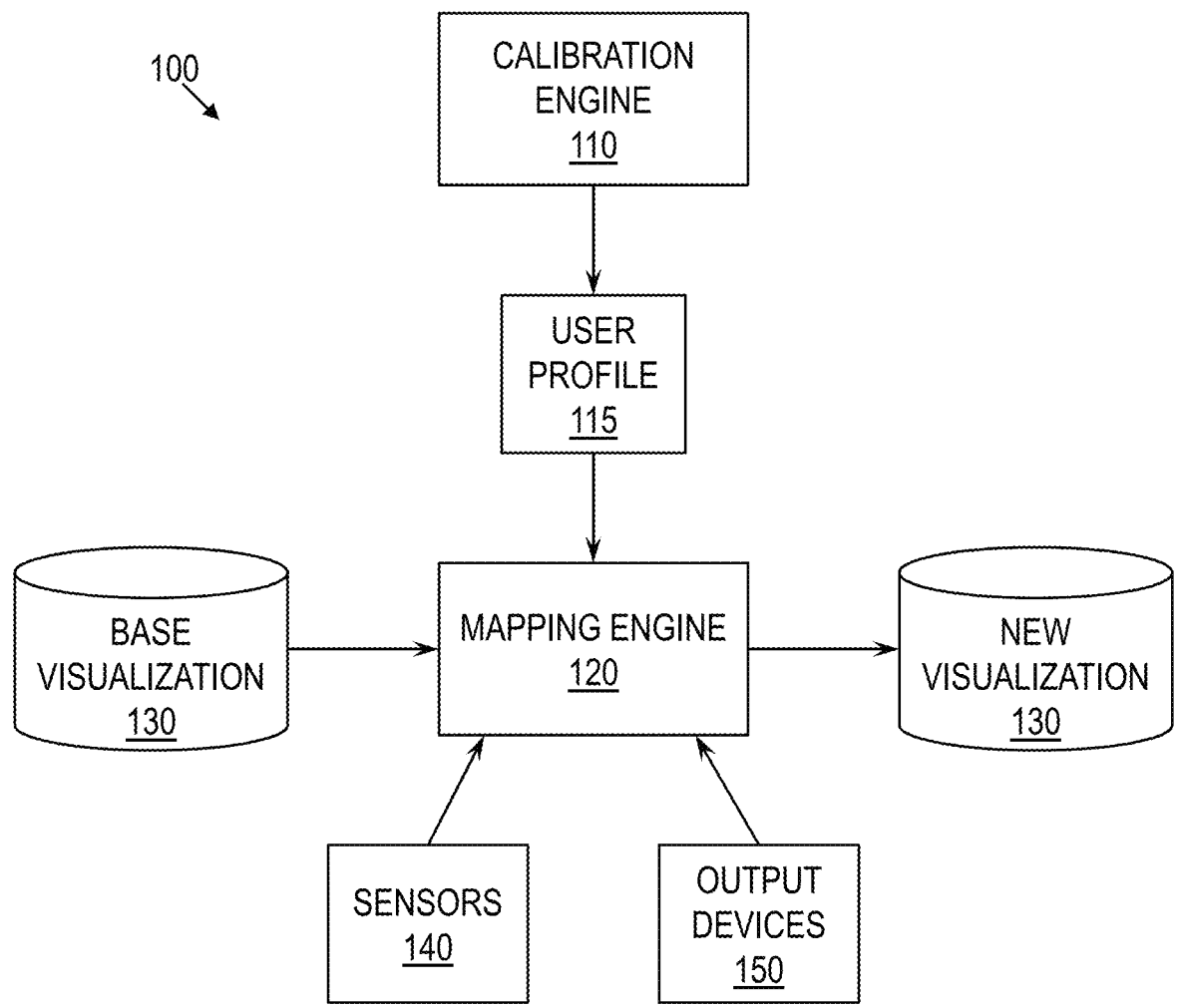
FIG. 1 is a block diagram of a visualization system according to some embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, people are occasionally faced with more dimensions or sources of data than can be adequately represented in a single picture, audio, or haptic sequence. While it is possible to create a data visualization that encompasses multiple modes (e.g., video and audio), building multimodal sequences can be difficult and time-consuming and can require significant manual input. Even when a multimodal visualization is exists, a visualization that suits one person is not necessarily useful, or as useful, to another because perceptual bandwidths vary from person to person. For instance, while one person may be able to see a full range of colors, another person may be colorblind. While one person may have superb hearing, another person may be hearing impaired. In short, people vary in their levels of sensitivity as well as attentiveness to gradients and subtleties. As such, visualizations are not always as useful as intended when viewed by a person other than the designer of that visualization.

Turning now to an overview of the aspects of the invention, one or more embodiments of the invention address the above-described shortcomings of the prior art by providing a mechanism to input an existing visualization, or data set, across one or more dimensions and to generate a new visualization based on the existing visualization, where the new visualization is based on a known perceptual bandwidth. The new visualization may be based on the original visualization, as well as on a target user's perceptual bandwidth, a target device's bandwidth, and one or more environmental factors. The mapping from the existing visualization to the new visualization may be a guided transformation that involves iterative feedback from both the target user and a user of the existing visualization. As needed, calibration of each user's bandwidth may be modified based on environmental factors, such as high ambient noise, for example.

The above-described aspects of the invention address the shortcomings of the prior art by enabling a data visualization, such as a user interface or infographic, to be mapped to a perceptive bandwidth of a viewer. Through the iterative feedback, such mapping may return the information deemed most important, while enabling the viewing user to perceive the data within his or her own bandwidth. As a result, users are able to experience data visualizations in a manner that reflects the information desired to be shared, regardless of perceptual bandwidth differences between a designer and a user, or between two users. Thus, embodiments of the invention fill a critical gap in providing visualizations to those with impairments or disabilities.

Turning now to a more detailed description of aspects of the present invention, FIG. 1 is a block diagram of a visualization system 100 according to some embodiments of the invention. As shown in FIG. 1, the visualization system 100 may include a calibration engine 110 and a mapping engine 120. Generally, the calibration engine 110 may generate a user profile 115, also referred to as a profile 115, for each user of the visualization system 100, where the profile 115 indicates the user's bandwidth perception, which is a set of bandwidths each associated with a respective modality. The mapping engine 120 may take as input a user profile 115 and a base visualization 130, as well as one or more environment factors detected through one or more optional sensors 140, and may output a new visualization 130. Each of the base visualization 130 and the new visualization 130 may be presented to the user through one or more output devices 150, which may include one or more of the following, for example: a monitor, speakers, and a haptic device.

One or both of the base visualization 130 and the new visualization 130 may be multimodal, and each mode, or dimension, of the base visualization 130 may be mapped in whole or part to a different mode in the new visualization 130 as needed based on the user profile 115 and iterative feedback, and as discussed in detail below. The new visualization 130 may be based on the user profile 115 and may thus be restricted to the bandwidth perception of the respective user of the user profile 115. In other words, the visualization system 100 may bandwidth-match or bandwidth-constrain a multimodal visualization 130 to suit the perceptual bandwidth of the user.

Embodiments of the visualization system 100 enable users to iteratively explore high-dimensional data. By understanding the perceptual bandwidths of multiple users, and through the use of iterative feedback from users, the visualization system 100 may automatically guide the mapping of a multimodal visualization 130 for optimal consumption by users. Rather than a user having to view a visualization 130 designed to be perceived outside of the user's capability, the user can instead view a visualization 130 inside his perceptual bandwidth, thus effectively utilizing the user's bandwidth. Because data visualizations 130 enable people to understand data and, thereby, make decisions based on that data, the visualization system 100 may be useful in enabling users to make informed decisions.

In some embodiments of the invention, as will be discussed in detail below, data is multiplexed from a set of input modalities to a set of output modalities, based on a user profile. In other words, data in one channel, or modality, may be converted to another channel or may be split into sub-channels and converted into multiple other channels. This flexibility may enable embodiments of the invention to retain useful information in a data set, even when a user's perception is limited in one or more modalities of the original data set. If a data set cannot be adequately mapped, then the visualization system 100 may receive iterative feedback to find a reasonable fit of the data set into the user's perceptual bandwidth. As such, information can be shared with a large group of users, regardless of preferred modalities.

Generally, the calibration engine 110 may receive input from a user to generate a user profile 115 for that user. More specifically, for instance, the calibration engine 110 may implement one or more bandwidth tests for measuring the user's range of perception with respect to one or more senses. For example, and not by way of limitation, the calibration engine 110 may be capable of testing one or more of the following, with the help of interactive input from the user: visual acuity and color, shade and tone differences, auditory, haptic proximity, and simultaneous feeds (e.g., a combination of sound, video, and haptic). These bandwidth tests may be used to generate a user profile 115 and, in some embodiments of the invention, to calibrate the use of the output devices 150. Such bandwidth tests are known in the art and may be utilized by the calibration engine 110 according to some embodiments of the invention.

Figure 2:
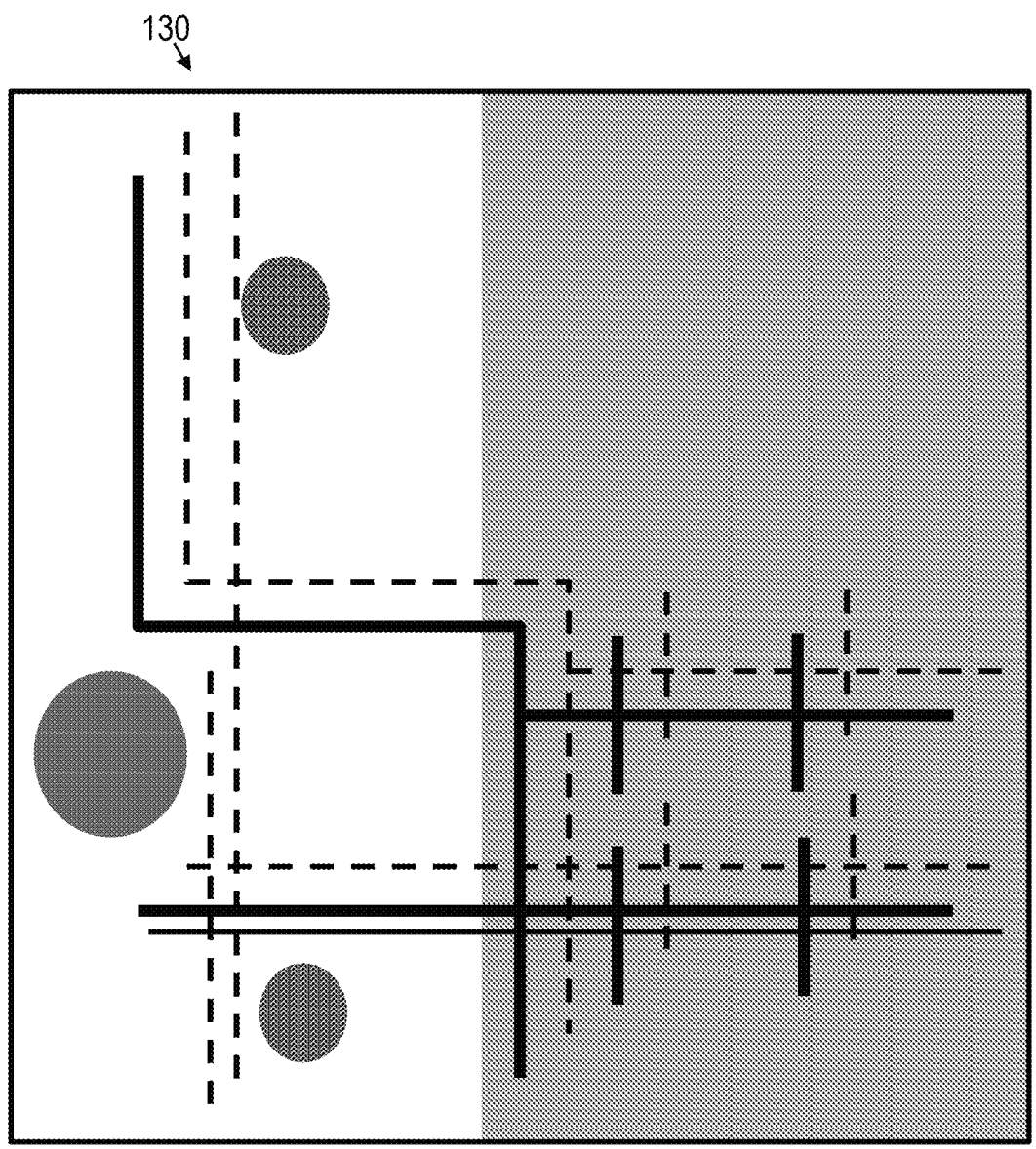
FIG. 2 illustrates an example visualization, transformable according to some embodiments of the invention.

FIG. 2 illustrates an example base visualization 130, transformable according to some embodiments of the invention. In this example, the base visualization 130 is a map sought to be shared with a new user for whom a user profile 115 already exists. Although FIG. 2 is in grayscale, this figure represents a base visualization 130 provided in color. The thin solid line represents a red line, which indicates the location of a power line on the map. The thick line represents a dark-blue line, which indicates roads on the map. The dashed line represented a light-blue line, which indicates a water line on the map. The ellipses represent parks, and the size of an ellipsis indicates the size of the respective park. The gray area on the right represents a pink area, which indicates commercial zoning, while the white area on the left indicates residential zoning. Given the various colors in this base visualization 130, a user who is red-green colorblind may be unable to understand the map provided in the base visualization 130, given the coloring described above.

In this example, the visualization system 100 may map colors in the base visualization 130 to haptic feedback. In other words, given a one-dimensional color scale from red to indigo, each color may be mapped to a vibration magnitude (e.g., in decibels). The result of this mapping may be a new visualization 130, which may be grayscale, but may provide haptic feedback upon interaction. When the user clicks on an area in the map or hovers over an area with a cursor, the haptic feedback corresponding to the original color may be provided as output to the user. Thus, the original information in the base visualization 130 is preserved by mapping color to haptic feedback, which the user can better perceive.

Figure 3:
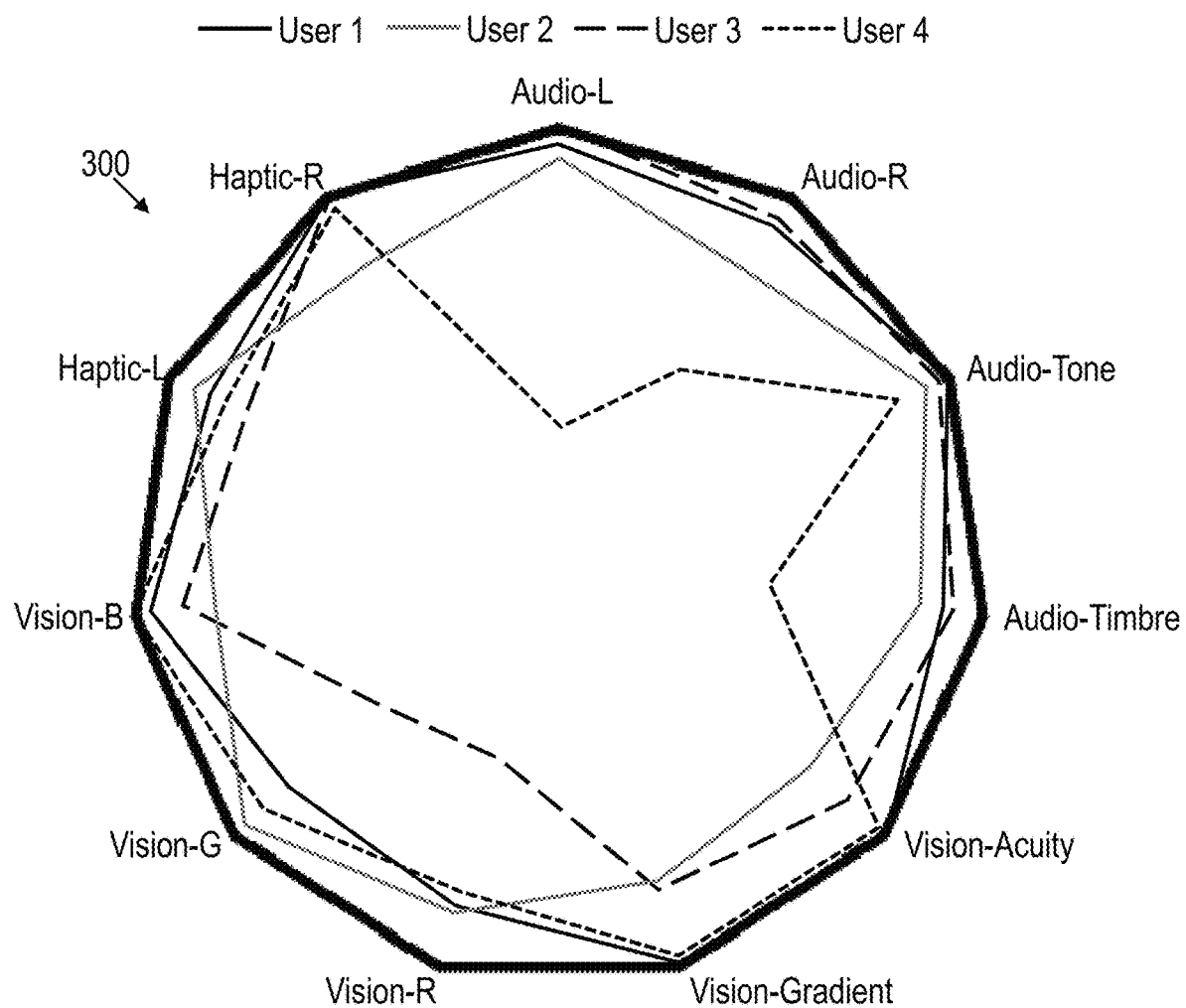
FIG. 3 illustrates an example set of perceptual bandwidths, according to some embodiments of the invention.

FIG. 3 illustrates an example set of perceptual bandwidths 300, according to some embodiments of the invention. Each of these is an example of a perceptual bandwidth 300 that may be generated by the calibration engine 110 and included in a respective user profile 115. Four perceptual bandwidths are shown, each indicated with a different line style. As shown in FIG. 3, in this example, a perceptual bandwidth may indicate a range for each of the following channels: left ear audio, right ear audio, audio tone, audio timbre, vision acuity, vision gradient, red vision, green vision, blue vision, left haptic, and right haptic. It will be understood, however, that a perceptual bandwidth 300 generated by the calibration engine 110 may indicate the range of one or more of the above or other channels. Although not shown, in some embodiments of the invention, bandwidth (i.e., range) in a channel may be different when a user is focused on that channel, as compared to when the user is receiving multimodal input. As such, a perceptual bandwidth 300 of the visualization system 100 may include one or more bandwidths for individual channels, as well as one or more bandwidths for combined channels. In some embodiments of the invention, each user known to the visualization system 100 is associated with a perceptual bandwidth 300 of that user, after the calibration engine 110 has generated such perceptual bandwidth 300 or received such perceptual bandwidth 300 from an external source. However, the perceptual bandwidth 300 may be only a baseline and may be temporarily modified as needed based on environmental factors, as will be discussed below.

In FIG. 3, four users are represented: User 1, User 2, User 3, and User 4. Users 1 and 2 represent individuals whose ranges for each channel fall into the expected ranges. User 3 has red-green colorblindness. User 4 is hearing-impaired. It should be noted that, while FIG. 3 is used for illustrative purposes, the scale used is arbitrary and unlabeled for each individual channel. Further, it will be understood that a perceptual bandwidth 300 may be represented in various ways. For example, and not by way of limitation, each perceptual bandwidth 300 may be represented as a range for each channel. In FIG. 3, each such range is plotted as a vertex in multi-dimensional space. It will be understood that other representations of a perceptual bandwidth 300 are also possible and could be used by some embodiments of the invention.

In some embodiments of the invention, given the perceptual bandwidth 300 of a new user and given an original data set, such as a base visualization 130, the mapping engine 120 of the visualization system 100 may map, or transform, the base visualization 130 to a new visualization 130, which is a data set that fits within the new user's bandwidth envelope. After an initial automated transformation performed by the visualization system 100, the visualization system 100 may fine-tune the result through an iterative method of consulting the new user a base user, who can perceive important signals in the base visualization 130. Specifically, for instance, the new user may make transformation that optimizes his or her own comfort level with respect to perceiving and understand the data, while the base user may make a further transformation or tweak to ensure that important features perceived in the data are preserved. As such, with the resulting new visualization 130, the user is able to perceive each underlying signal or pattern in the base visualization 130 by viewing the new visualization 130, which may include the same underlying signal or pattern.

As will be discussed in detail below, various techniques may be used to perform transformations of a current visualization 130 as it is transformed from the base visualization 130 to the new visualization 130. For instance, bandwidth reduction may be performed, including, for instance, one or more of various nonlinear compressions and band-limiting multi-scale decomposition (e.g., through the use of wavelets, Fourier transforms, or scale space) in a time or spatial domain. The visualization system 100 may make recommendations for compression, as needed, as well as for porting of a selected output stream (i.e., a channel or subchannel of a current visualization 130) to an input stream (i.e., a channel or subchannel of an updated visualization 130). In some embodiments of the invention, each compression is fixed or limited based on a user's ability to perceive data, as indicated by the respective perceptual bandwidth 300. The visualization system 100 may map an output stream to one or more input streams (e.g., by way of principal component analysis (PCA) or non-linear projection), based on the complexity of the output stream, as defined by standard statistical metrics (e.g. histogramming, wavelet channel energy). Thus, the visualization system 100 may recommend the mapping of more complex feeds to the highest-bandwidth output streams for the user profile. A more detailed description of these techniques and others follows below.

Figure 4:
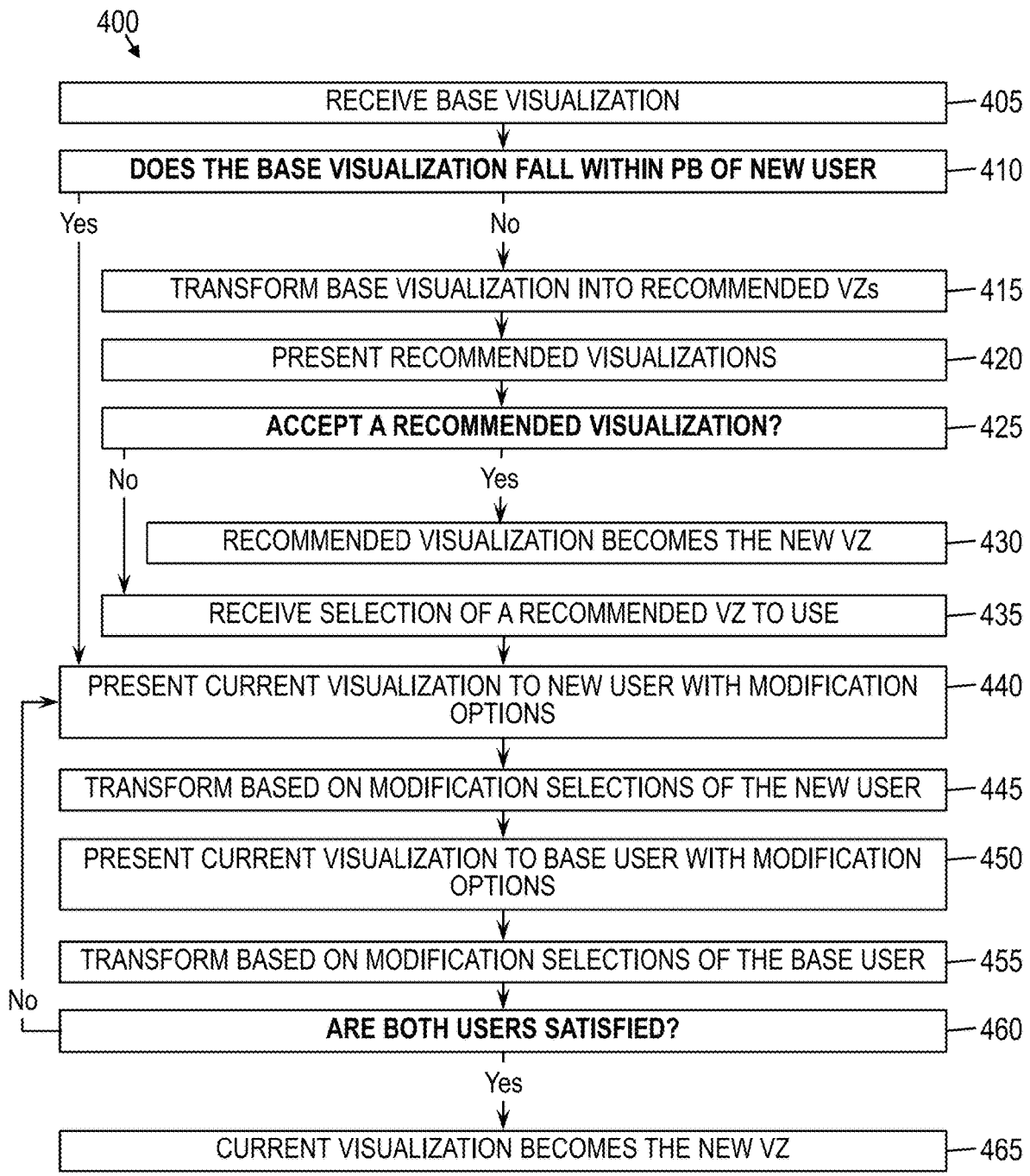
FIG. 4 is a flow diagram of a method of mapping a base visualization to a new visualization, according to some embodiments of the invention.

FIG. 4 is a flow diagram of a method 400 of mapping a base visualization 130 to a new visualization 130, according to some embodiments of the invention. This method 400 may be performed by the mapping engine 120, for example. The base visualization 130 is an original data set in a first set of dimensions, or modalities, while the new visualization 130 is a transformed data set in a second set of dimensions, where the first set of dimensions and the second set of dimensions need not, but can, be the same. The number as well as the type of the dimensions may change in mapping the base visualization 130 to the new visualization 130.

As shown in FIG. 4, at block 405, an original data set is received in the form of a base visualization 130. This base visualization 130 may be suited for a base user, who may be the designer of the base visualization 130 or may be a user for whom the base visualization 130 fits into the respective bandwidth envelope. However, a new user wishes to view the base visualization 130, and the method 400 may seek to map the base visualization 130 to a new visualization within the perceptual bandwidth 300 of the new user. In this example, both the base user and the new user are already be associated with respective user profiles 115 in the visualization system 100, and thus the visualization system 100 may associate each user with a respective perceptual bandwidth 300.

Figure 5A:
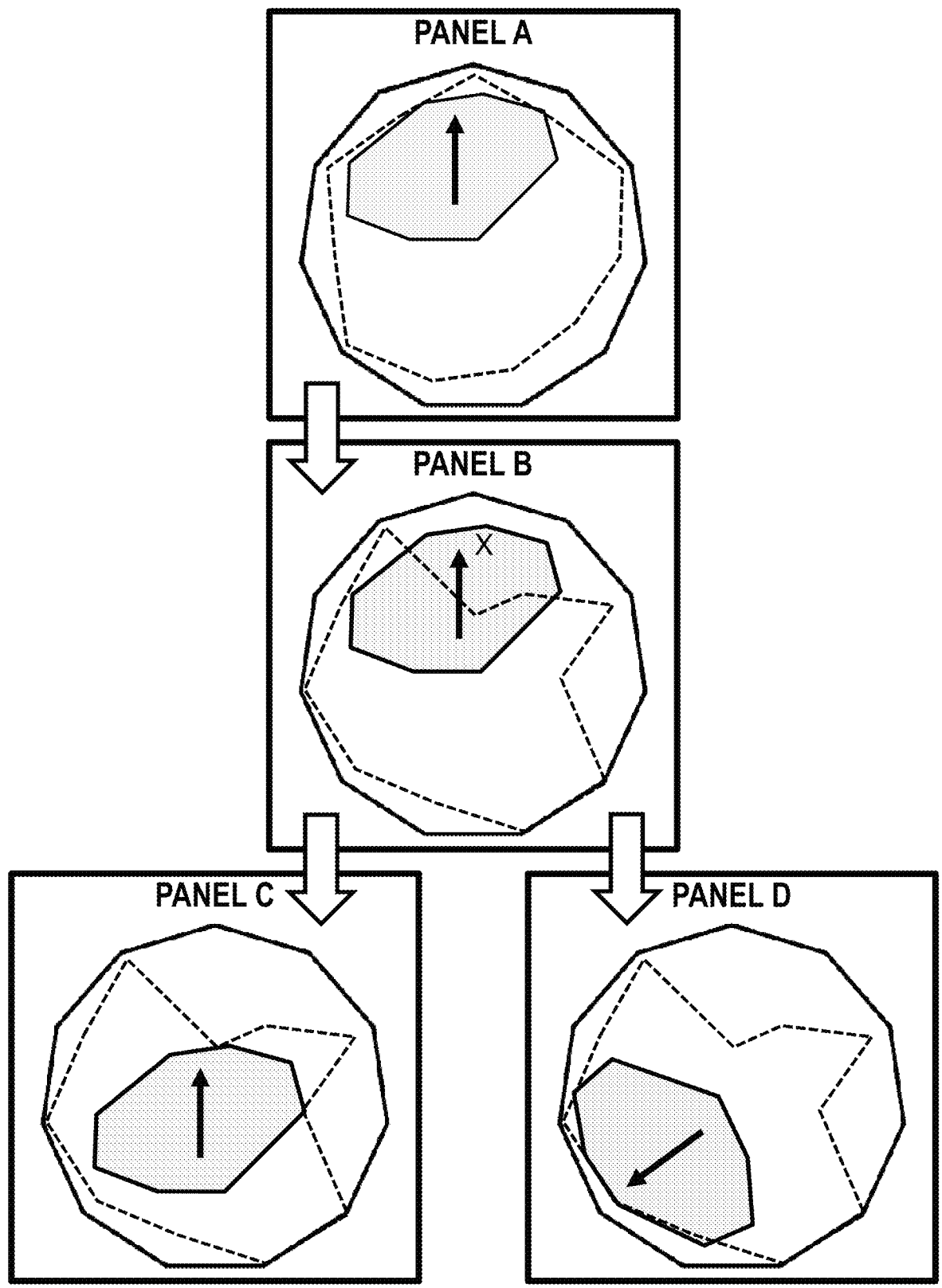
FIGS. 5A-5B illustrate a workflow of mapping a data visualization from the perceptual bandwidth of a first user to the perceptual bandwidth of a second user, according to some embodiments of the invention.
Figure 5B:
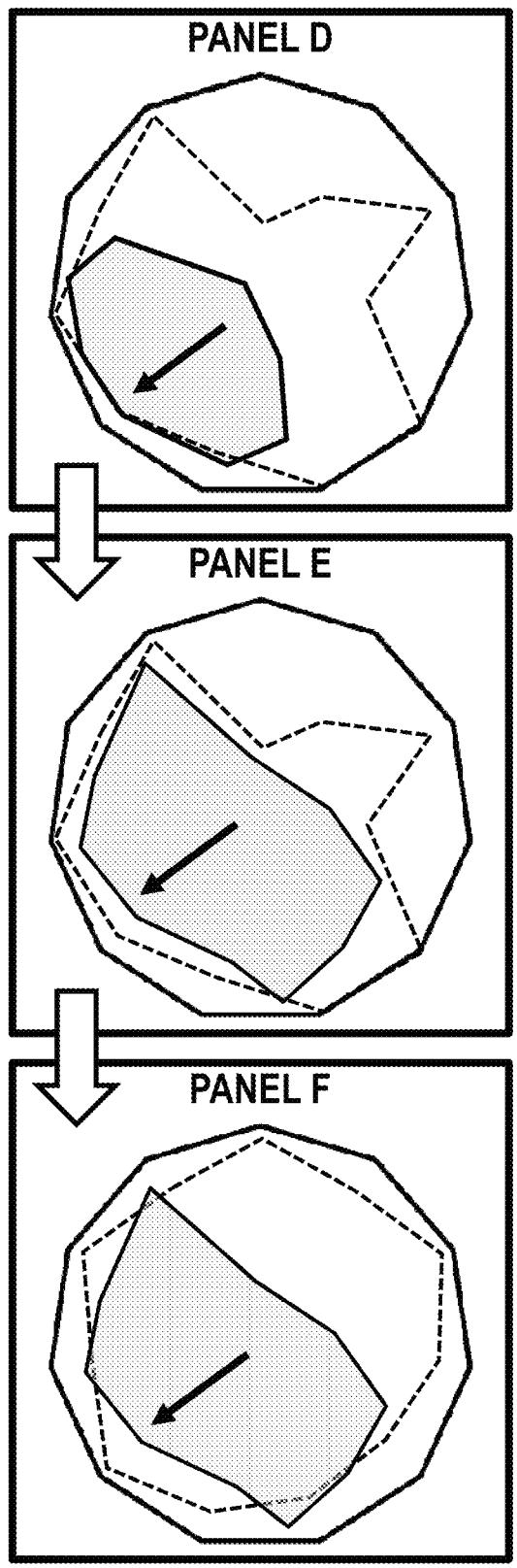

FIG. 5A and FIG. 5B illustrate a workflow of mapping the base visualization 130 to a new visualization 130 or, in other words, from the perceptual bandwidth 300 of the base user to the perceptual bandwidth 300 of the new user, according to some embodiments of the invention. Specifically, FIG. 5A shows four panels related to the workflow of the mapping: Panel A, Panel B, Panel C, and Panel D. FIG. 5B shows three panels related to this same workflow: Panel D, Panel E, and Panel F. In both FIG. 5A and FIG. 5B, an applicable perceptual bandwidth 300 is shown as a polygon of dashed lines. Panel A of FIG. 5A shows the base visualization 130 received. As shown, the base visualization 130 may be represented in a manner similar to that in which perceptual bandwidths 300 are represented, specifically as a set of ranges of various channels. The arrow shown inside the base visualization 130 represents an arbitrary data vector in the base visualization 130 and is included to better illustrate how the base visualization 130 is transformed across the workflow. The various remaining panels of FIG. 5A and FIG. 5B will be discussed below with reference to the method 400 of FIG. 4.

In some embodiments of the invention, when a user is presented with a visualization 130, the visualization 130 may or may not be presented in the current format of the visualization 130. The current format of a visualization 130 may prove problematic if a user is unable to perceive the data well enough to make modifications Rather, an abstract presentation may be sent to the user alternatively to, or additionally to, the visualization 130 in its current format. The abstract presentation can assist the user in understanding the data in the visualization 130, even though some parts of the data may fall outside of the user's perceptual bandwidth 300. For example, and not by way of limitation, such an abstract visualization 130 may look similar to the panels of FIG. 5A and FIG. 5B. For another example, and not by way of limitation, the visualization system 100 may present to the user one or more statistical readouts on various channels and subchannels or may present metric spaces (e.g., gray level covariance), in addition to a list of available output modalities and palette elements useable for transformations.

As shown in FIG. 4, at decision block 410, it may be determined whether the base visualization 130 falls within the perceptual bandwidth (PB) 300 of the new user. As discussed above, each perceptual bandwidth 300 may include a range for each channel represented in the perceptual bandwidth 300. Additionally, the various ranges and channels in the base visualization 130 may be known or detected. For instance, if the base visualization 130 includes color in each of the red, blue, and green channels, the range of the base visualization 130 in each of such channels may be compared to the respective ranges in the perceptual bandwidth 300 of the new user. If the base visualization 130 does fall within the perceptual bandwidth 300 of the new user, then the method 400 may skip ahead to block 440. However, if the base visualization 130 does not fit within the perceptual bandwidth 300 of the new user, then the method 400 may proceed to block 415. Panel B of FIG. 5A illustrates an example in which the base visualization 130 does not fit the new user's perceptual bandwidth 300.

At block 415 of FIG. 4, the visualization system 100 may automatically transform the base visualization (VZ) 130 into one or more recommended visualizations 130 that fit, or at least better fit, the new user's perceptual bandwidth 300. This may be performed in various ways. For example, and not by way of limitation, the following activities may be involved in generating a recommended visualization 130: identifying channels that are oversaturated given the new user's perceptual bandwidth 300, decomposing oversaturated channels into other channels or into temporal or spatial segments, discarding uniform information on the oversaturated channels, identifying one or more highest-information subchannels, and determining how to port data in high-information subchannels to other channels or subchannels.

As mentioned above, the visualization system 100 may identify channels that are oversaturated given the new user's perceptual bandwidth 300. An oversaturated channel refers to a channel in the new user's perceptual bandwidth 300 that is overextended, such that the user cannot perceive the entirety of the range used in that channel in the base visualization 130. Identifying each oversaturated channel may involve comparing the range of each channel in the base visualization 130 to the range of each channel in the new user's perceptual bandwidth 300. Each range that in the base visualization 130 that extends beyond the respective range of the perceptual bandwidth 300 may be deemed oversaturated.

As mentioned above, the visualization system 100 may decompose oversaturated channels into other channels or into temporal or spatial segments. Various techniques may be used for this purpose. For example, and not by way of limitation, one or more of the following may be performed on an oversaturated channel: eigenvector decomposition, scale space decomposition, wavelet decomposition, discrete-time Fourier transform (DTFT), short-time Fourier transform (STFT), and convolution filter banks. For low dimensionalities (e.g., one to four dimensions), these operations may be relatively simple to compute, and one skilled in the art may be capable of performing these operations on each channel.

As mentioned above, the visualization system 100 may discard uniform information in an oversaturated channel. This can be accomplished by characterizing channels utilizing mutual information, or through the use of a statistical or uniformity metric, or by discarding a first principal component. Further, one or more methods may be used to discard uniform, or homogenous, information, such as a compression method, a separability method, or a spatial method. In the compression method, undesirable noise may be discarded. For instance, if a consistent signal or pattern is present throughout the base visualization 130 (e.g., a red background), then the consistent signal or pattern may be discarded. With respect to the separability method, also referred to as a method for mutual information or segmentation, the visualization system 100 may determine one or more well-defined boundaries or clusters, and may further decide whether certain input streams define or represent these regions. In that case, these input streams may be used in place of the entire region. For instance, if shades of a color are used in conjunction with audio volume, such that both increase together across the base visualization 130, then one of these channels may be removable without the loss of information. Tools exist for determining whether certain inputs represent a group. Such methods include, for example, mutual information, Fischer information, and class separability metrics.

In the spatial method, it may be determined whether shifting the window of the range of the channel, or the focus area, would make certain data equivalent to other data across the entire base visualization 130. Following are examples that are provided for illustrative purposes and do not limit the scope of embodiments of the invention. One example of a spatial method involves grid removal. For instance, an image is subdivided into sub-image tiles, and each tile is histogrammed or bandwidth-calculated along its respective modalities. The resulting histograms are compared across tiles. If one tile appears to have significantly more complex information (e.g., more bandwidth) than the others, then this tile may be removed or may be presented to the user as a candidate for removal or further filtering. Another example of a spatial method involves a window shift. For instance, suppose there exists an image, and a box encompasses approximately eighty percent of that image. Bandwidth statistics for the sub-region of the image inside the box are calculated and compared to the image as a whole. The box is shifted slightly, perhaps arbitrarily, and the same sub-region statistics are computed. This approach is sometimes referred to as kernel processing. After considering the various spatial centerings for the box, the one with the most significant drop in bandwidth can be selected as a cropped area that would be a suitable visualization transformation. Another example of a spatial method is Geographic Information System (GIS) specific. GIS data is largely rendered as palette data, such that each palette element in the data incurs a respective marker, color, or contour. By examining tiles or sub-regions, as described in the examples above, for the total number of palette elements used, a proxy can be established for bandwidth of the region (e.g., the tile or sub-region), and this a smaller region can be selected for use. In practice, for example, if the base visualization 130 is the result of GIS contour mapping performed on an image of the Grand Canyon, then a town on the edge of the image may include irrelevant infrastructure elements. That town may therefore be cropped through the use of this spatial method.

As mentioned above, the visualization system 100 may identify one or more highest-information subchannels. A subchannel may refer to a portion, or sub-range, of a channel that has been split or decomposed. The visualization system 100 may arbitrarily divide an oversaturated channel into sub-ranges, and each such sub-range may represent a subchannel. For instance, the range in use within a channel in the base visualization 130 may be divided equally based into two subchannels. A high-information subchannel may be a subchannel that is dense with data from the base visualization 130. Highest-information subchannels (i.e., one or more channels with the highest information as compared to other subchannels) may be identified through one or more existing techniques, such as channel energy or channel entropy, other metrics used in compression.

As mentioned above, the visualization system 100 may determine how to port data in high-information subchannels to other channels or subchannels. In other words, after a channel has been divided into subchannels, a high-information subchannel may be transformed to a different channel or subchannel, thus reducing the remaining range of the first channel. To this end, the visualization system 100 may determine how much bandwidth (i.e., what portion of the respective range) of a subchannel should be ported to one or more alternate output streams (i.e., channels or subchannels of an updated visualization 130) and may also determine the available bandwidth on such output streams. This may be performed through techniques such as scale space decomposition, which may be utilized along with identifying low-energy channels or unused channels to use as targets.

In some embodiments of the invention, a user profile 115 may indicate one or more user preferences of the respective user. For example, and not by way of limitation, the user profile 115 may indicate preferred channels or subchannels to receive ported data from other channels or, more specifically, may indicate preferred a preferred mapping from a first channel to a desired second channel, such that if it is determined that the first channel should be ported, the user preferences indicate which channel is to receive the ported data. User preferences may be consulted by the visualization system 100 one determining recommended visualizations 130.

In some embodiments of the invention, when porting an input stream to an output stream, especially when the input stream is oversaturated, channel palettes may be used. For example, and not by way of limitation, a channel palette may be a tone palette, a tone-pattern palette, or a texture palette. Palettes can be useful to compress an input stream, or when a continuous transform is not defined in the applicable context. Generally, using a palette involves taking a continuous variable (e.g., color intensity, sound volume) in an input stream, breaking it into groups, and assigning each group to a specific output, also referred to as a palette element, in the output stream. Palettes are usually used with respect to colors, but according to some embodiments of the invention, the concept can be extended to other modalities. Example palettes include a series of tones, such as a twelve-tone scale; a set of buzzing patterns or intensity in a haptic channel, or a haptic image if haptic-grid feedback is available; and discrete colors or textures. The use of a palette can avoid the complexity and restrictiveness of exactly mapping one domain to another. For instance, to port visual to an eight-tone audio palette is to break the visual into eight distinct region types, and then arbitrarily assign each region type a tone. Ordinality may or may not play a role in such a mapping, and arbitrary assignment may be sufficient for modality transformation.

At block 420, the visualization system 100 may present the one or more recommended visualizations 130 to the new user. Panels C and D of FIG. 5A illustrate two such recommended visualizations 130 in the ongoing example. As shown, each recommended visualization 130 may fit within the new user's perceptual bandwidth 300, or may at least be a closer fit as compared to the base visualization 130.

At decision block 425, it may be determined whether the user accepts one of the recommended visualizations 130. For instance, the visualization system 100 may prompt the user to select one of the recommended visualizations 130 or to indicate that none of the recommended visualizations 130 is acceptable. If a recommended visualization 130 is selected, then the recommended visualization 130 becomes the new visualization 130 at block 430 and the method 400 ends. However, if no recommended visualization 130 is accepted, then the method may skip to block 435.

At block 435, the visualization system 100 may receive a selection of one of the recommended visualizations 130 to use as a current visualization 130 moving forward. In the example of FIG. 5A, the user selects the visualization 130 in Panel D. Thus, FIG. 5B begins with the visualization 130 of Panel D as the current visualization 130. At this point in the method 400 of FIG. 4, the visualization system 100 may begin an iterative process of receiving feedback from the new user and the base user to modify the current visualization 130 to better suit the new user. At block 440, the visualization system 100 may present the current visualization 130 to the new user with options for modification. Additionally, in some embodiments of the invention, the visualization system 100 notifies the new user of transformations already made, such that the new user can make informed decisions about further transformations.

The visualization system 100 may prompt the new user for guidance as to how to transform the recommended visualization 130. For instance, the visualization system 100 may prompt the user to select an input stream (i.e., a channel or subchannel in the current visualization 130), and the visualization system 100 may enable the user to port the selected input stream an alternative output stream (i.e., a channel or subchannel of an updated visualization 130). In some embodiments of the invention, the visualization system 100 may present one or more modification options to the new user regarding which channel or subchannel to port and regarding which target channel or subchannel is to receive the selected channel or subchannel. In making such a recommendation, one or more prioritizations may be considered.

In a first prioritization scheme, the visualization system 100 may seek to preserve as much as possible of the original data in its native format (i.e., original modalities). Thus, dense channels may be selected for porting before more sparse channels. As a result, it may be more likely that each denser channel is able to be retained within a single new channel. In a second prioritization scheme, the visualization system 100 may seek to use a direct translation as opposed to a lossy translation. For instance, the visualization system 100 may avoid compression to a channel or subchannel that has a smaller range in the perceptual bandwidth 300 of the new user as compared to the range of the selected channel or subchannel, where meaningful data would be lost.

The visualization system 100 may provide a modification option to map subchannels of oversaturated channels of the base visualization 130 to channels with available bandwidth. For instance, the visualization system 100 may perform direct mapping from an input stream to an output stream having the same number of dimensions. For example, and not by way of limitation, a one-dimensional space, such as a sound pattern, may be mapped to another one-dimensional space, such as a haptic channel. For another example, the data within an oversaturated input stream may be compressed via a metric (e.g., covariance matrix score, channel energy, channel entropy) by generating a histogram equalized space of the metric and mapping a quantized version of the metric to one or more available output streams. In this manner, the visualization system 100 may cluster or histogram equalized metrics to fit the number of palette elements available.

Using the above techniques or others, the visualization system 100 may present the new user with one or more channels or subchannels as a target for porting a selected input stream. At block 445, upon receiving from the new user an indication of a selected modification, the visualization system 100 may make the selected modification to further transform the current visualization 130 as indicated by the user. In some embodiments of the invention, the user's selected modifications may be saved in the user profile 115 of the new user, thus enabling the visualization system 100 to give future preference to the types of transformations selected or to the input or output streams selected by the new user for porting. In the example of FIG. 5B, Panel E shows the current visualization 130 after the user's selected modifications. The visualization system 100 may continue presenting modification options, and the new user may continue making modifications until the new user is satisfied with the current visualization 130.

When the new user is satisfied, the current visualization 130, as modified, may be presented to the base user at block 450 along with modification options. In some embodiments of the invention, the visualization system 100 also notifies the base user of transformations that have been performed, so that the base user is able to make further transformations based on this information. The techniques used to present modification options to the base user may be the same or similar to those used to present modification options to the new user. At block 455, modification selections may be received from the base user to further transform the current visualization 130, to ensure that the current visualization 130 retains the data deemed important to the base user. In other words, the base user may be given an opportunity to provide a more suitable mapping, such that any important information conveyed in the base visualization 130 is retained. In some embodiments of the invention, changes made by the base user at this stage may be saved by the visualization system 100 as preferences for the base user, or as preferences for the pair that include both the new user and the base user. In FIG. 5B, Panel F shows a modification made by the base user to ensure that important features of the original base visualization 130 are retained in the current visualization 130.

In the method 400 of FIG. 4, this iterative feedback loop of receiving modifications from both the new user and the base user may continue until, at decision block 460, both users approve the modified recommended visualization 130. When both users approve, the recommended visualization 130, as modified through iterative feedback may become the final new visualization 130 and the method 400 ends at block 465.

As mentioned above, the visualization system 100 may account for environmental factors because such factors can effectively modify, such as by limiting, a user's perceptual bandwidth 300. For instance, in an environment near a constructions site, loud noise of the construction equipment can degrade the audio bandwidths of the user. For another example, using a computer display to view data in bright sunlight can degrade visual contrast and color ranges.

As such, in some embodiments of the invention, the one or more sensors 140 are used by the visualization system 100 to detect environmental factors. The sensors 140 may include, for example, one or more of the following: a microphone, a camera, an accelerometer, or another detection device. When first generating a perceptual bandwidth 300 for a user, the visualization system 100 may utilize the one or more sensors 140 to determine a baseline environment at the time of generating the perceptual bandwidth 300. Each time the user's perceptual bandwidth is used, to generate a visualization 130 for the user or otherwise, the user's perceptual bandwidth 300 may be adjusted based on the difference between the current environment and the baseline environment.

Generally, bandwidth can be specifically measured across spectra (e.g., in hertz or decibels), and bandwidth can describe a discrete range of the spectra. The visualization system 100 may mark as temporarily unavailable specific regions of a user's perceptual bandwidth 300, or specific palette elements. For instance, the Vuvuzela, a type of plastic horn, is was characterized to generate a noise range that is about 100 Hz wide, centered at 300 Hz, thus effectively occupying a portion of the audio bandwidth spectrum. If a Vuvuzela is being played loudly in the background, such as may be the case at a sporting event, then the visualization system 100 may detect that this range of audio bandwidth is unavailable, and may therefore modify the user's perceptual bandwidth 300 to indicate the user's current inability to perceive the applicable range of sound. More generally, if an element similar to an output option is present in the environment, the visualization system 100 may adjust the user's perceptual bandwidth 300 by disabling the corresponding output option in the user's perceptual bandwidth 300.

The adjusted perceptual bandwidth 300 may be used to generate visualizations 130 for the user as needed in the current environment. More generally, when abnormal conditions are detected, the visualization system 100 may temporarily adjust the user's perceptual bandwidth 300 to reflect adjusted perceived channel ranges due to the environmental factors. As such, when a perceptual bandwidth 300 is used, such as to determine a suitable visualization 130, as in the method 400 of FIG. 4, a temporary perceptual bandwidth 300 may be used rather than the baseline perceptual bandwidth 300 of the user.

In some embodiments of the invention, the visualization system 100 is capable of detecting the respective bandwidth of one or more of the output devices 150. If an output device 150 limits the available bandwidth of a channel that can be output to the user, then analogously to the above, the user's perceptual bandwidth 300 may be temporarily adjusted as needed based on the limitation. In that case, the resulting temporary perceptual bandwidth 300 may be used to generate visualizations 130 for the user.

Figure 6:
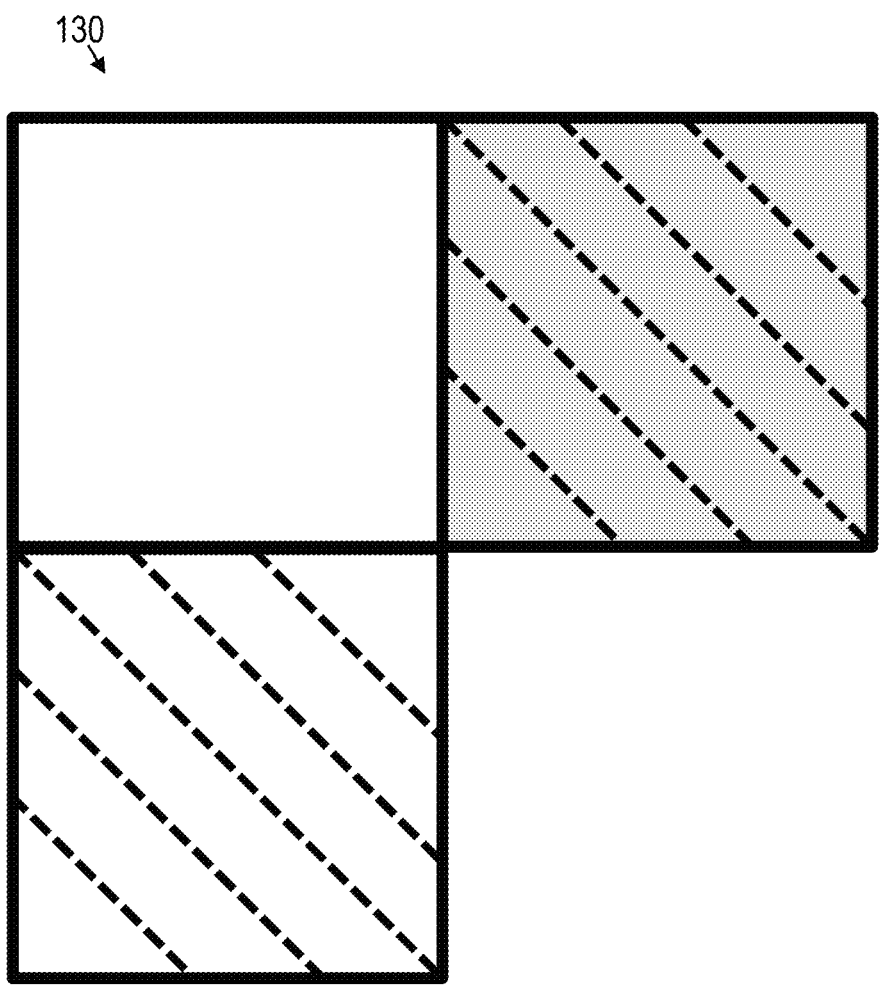
FIG. 6 illustrates another example visualization, transformable according to some embodiments of the invention.

FIG. 6 illustrates an example base visualization 130, which can be transformed into a new visualization 130, according to some embodiments of the invention. Although FIG. 6 is in grayscale, certain aspects of FIG. 6 represent objects in color. For instance, the light gray background in FIG. 6 represents blue-green in the base visualization 130, while the dashed stripes represent green in the base visualization 130. Thus, the base visualization 130 includes the colors black and white, as shown, as well as the colors blue-green and green, which are represented by light gray and dashed lines.

A user desiring to view this base visualization may be unable to perceive the colors, and thus, some details of the base visualization 130 would be lost to the user if the base visualization 130 remained unchanged. In this example, the visualization system 100 has previously generated a user profile 115, including a perceptual bandwidth 300, for the user. Thus, upon comparing the base visualization 130 to the perceptual bandwidth 300, the visualization system 100 may determine that the user cannot perceive the data shown in the base visualization 130. However, it may be determined that the user has speakers useful for audio output, and it may be further determined that no audio channels are in use in the base visualization.

Once it is determined that the user does not see the colors, the visualization system 100 may then seek to port the color channels to a different dimension. In this example, that different dimension is sound. Sound may be selected for various reasons, such as one or more of the following: availability of speakers, or an indication in the user profile 115 that sound is a preferred channel.

To port color to sound, the visualization system 100 may determine a gray-level covariance matrix (GLCM) for each of the two colors in the base visualization 130. For instance, the GLCM for the blue-green may be $$\begin{bmatrix} 10 & 5 & 0 \\ 5 & 5 & 0 \\ 0 & 0 & 0 \end{bmatrix},$$

and the GLCM for the green may be $$\begin{bmatrix} 10 & 0 & 5 \\ 0 & 0 & 0 \\ 5 & 0 & 5 \end{bmatrix}.$$

In some embodiments of the invention, resulting GLCMs are grouped, or clustered, based on similarity according to one or more metrics. For many data compression or clustering algorithms, it may be unproductive to work in a native data space (e.g., pixels or a sound waveform). Thus, a transformation may be performed to produce a more useful space, such as a wavelet domain. A sub-channel or sub-image may be further summarized into a single number or textual tag, as such representations are readily compatible with a large amount of extant algorithms. More specifically, in some embodiments of the invention, the native space (e.g., color in the above example) is transformed into another domain, such as a wavelet domain, and is then summarized into GLCMs. A metric may then be selected to preserve one or more aspects of the data. For example, and not by way of limitation, a basic texture swatch can be represented by a few GLCM summary metrics as opposed to a 15 megapixel image of that texture.

Each GLCM or group of GLCMs may be translated into a sound, or into a decibel level. As such, in the new visualization 130, the colors of the base visualization 130 may be incorporated into an audio channel. As such, when the user selects a position in the new visualization 130, such as by hovering a cursor over the position or by clicking a mouse at the position, then a speaker may output the sound associated with the GLCM of the color in the selected position of the base visualization 130. It will be understood that, if there are other colors in the base visualization 130, this technique can be applied to each of such colors.

Figure 7:
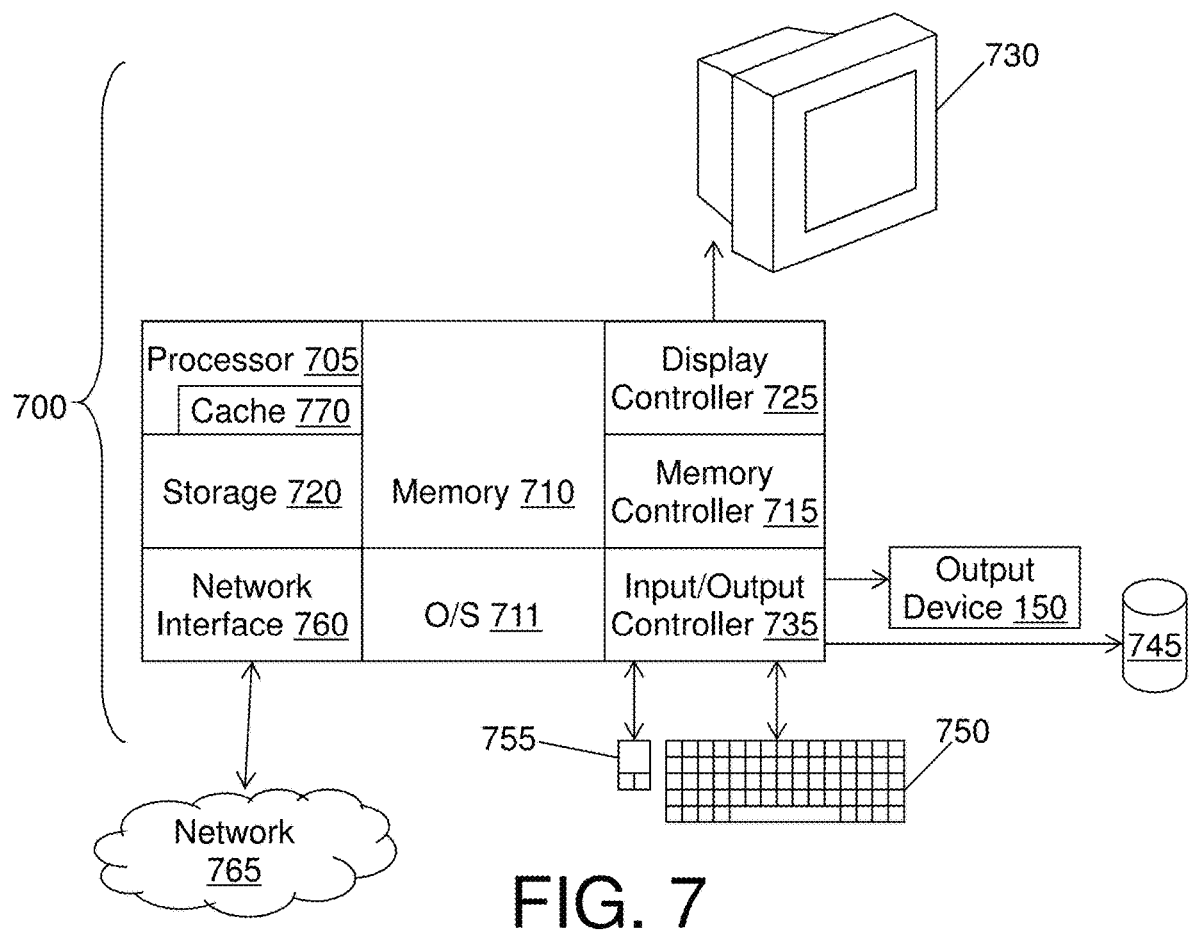
FIG. 7 is a block diagram of a computer system for implementing some or all aspects of the visualization system, according to some embodiments of this invention.

FIG. 7 is a block diagram of a computer system 700 for implementing some or all aspects of the visualization system 100, according to some embodiments of this invention. The visualization systems 100 and methods described herein may be implemented in hardware, software (e.g., firmware), or a combination thereof. In some embodiments, the methods described may be implemented, at least in part, in hardware and may be part of the microprocessor of a special or general-purpose computer system 700, such as a personal computer, workstation, minicomputer, or mainframe computer.

In some embodiments, as shown in FIG. 7, the computer system 700 includes a processor 705, memory 710 coupled to a memory controller 715, and one or more input devices 745 and/or output devices 150, such as peripherals, that are communicatively coupled via a local I/O controller 735. These devices 740 and 745 may include, for example, a printer, a scanner, a microphone, and the like. Input devices such as a conventional keyboard 750 and mouse 755 may be coupled to the I/O controller 735. The I/O controller 735 may be, for example, one or more buses or other wired or wireless connections, as are known in the art. The I/O controller 735 may have additional elements, which are omitted for simplicity, such as controllers, buffers (caches), drivers, repeaters, and receivers, to enable communications.

The I/O devices 740, 745 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 705 is a hardware device for executing hardware instructions or software, particularly those stored in memory 710. The processor 705 may be a custom made or commercially available processor, a central processing unit (CPU), an auxiliary processor among several processors associated with the computer system 700, a semiconductor-based microprocessor (in the form of a microchip or chip set), a macroprocessor, or other device for executing instructions. The processor 705 includes a cache 770, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 770 may be organized as a hierarchy of more cache levels (L1, L2, etc.).

The memory 710 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 710 may incorporate electronic, magnetic, optical, or other types of storage media. Note that the memory 710 may have a distributed architecture, where various components are situated remote from one another but may be accessed by the processor 705.

The instructions in memory 710 may include one or more separate programs, each of which comprises an ordered listing of executable instructions for implementing logical functions. In the example of FIG. 7, the instructions in the memory 710 include a suitable operating system (OS) 711. The operating system 711 essentially may control the execution of other computer programs and provides scheduling, input-output control, file and data management, memory management, and communication control and related services.

Additional data, including, for example, instructions for the processor 705 or other retrievable information, may be stored in storage 720, which may be a storage device such as a hard disk drive or solid-state drive. The stored instructions in memory 710 or in storage 720 may include those enabling the processor to execute one or more aspects of the visualization systems 100 and methods of this disclosure.

The computer system 700 may further include a display controller 725 coupled to a display 730. In some embodiments, the computer system 700 may further include a network interface 760 for coupling to a network 765. The network 765 may be an IP-based network for communication between the computer system 700 and an external server, client and the like via a broadband connection. The network 765 transmits and receives data between the computer system 700 and external systems. In some embodiments, the network 765 may be a managed IP network administered by a service provider. The network 765 may be implemented in a wireless fashion, e.g., using wireless protocols and technologies, such as WiFi, WiMax, etc. The network 765 may also be a packet-switched network such as a local area network, wide area network, metropolitan area network, the Internet, or other similar type of network environment. The network 765 may be a fixed wireless network, a wireless local area network (LAN), a wireless wide area network (WAN) a personal area network (PAN), a virtual private network (VPN), intranet or other suitable network system and may include equipment for receiving and transmitting signals.

Visualization systems 100 and methods according to this disclosure may be embodied, in whole or in part, in computer program products or in computer systems 700, such as that illustrated in FIG. 7.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving a base visualization comprising first data in a first set of channels, wherein each channel in the first set of channels is associated with a respective range in the base visualization;
detecting that the respective ranges of the first set of channels fall outside a perceptual bandwidth of a first user, the perceptual bandwidth of the first user previously determined based at least in part on a result of a bandwidth test implemented by a calibration engine to measure a range of perception of the first user with respect to a plurality of senses including measuring a plurality of aspects of at least one of the plurality of senses based at least in part on input from the first user; and
automatically transforming the base visualization to a second visualization, based on the perceptual bandwidth of the first user, wherein the second visualization comprises second data in a second set of channels, wherein each channel in the second set of channels is associated with a respective range in the second visualization,
the respective ranges of the second set of channels falling within the perceptual bandwidth of the first user.

2. The computer-implemented method of claim 1, further comprising receiving iterative feedback from the first user and from a second user to further transform the second visualization into a new visualization, wherein the base visualization fits into the perceptual bandwidth of the second user.

3. The computer-implemented method of claim 1, further comprising:
detecting an environmental factor; and
adjusting the perceptual bandwidth of the first user based on the environmental factor.

4. The computer-implemented method of claim 1, further comprising:
detecting a bandwidth of an output device; and
adjusting the perceptual bandwidth of the first user based on the bandwidth of the output device.

5. The computer-implemented method of claim 1, wherein the automatically transforming the base visualization to the second visualization comprises porting an input stream, comprising a first channel of the base visualization, to an output stream of the second visualization, wherein the output stream comprises a second channel distinct from the input stream.

6. The computer-implemented method of claim 5, wherein the porting the input stream to the output stream comprises compressing the first channel of the base visualization to fit within an available bandwidth of the second channel in the perceptual bandwidth of the first user.

7. The computer-implemented method of claim 5, wherein the porting the input stream to the output stream comprises splitting the first channel across a respective available bandwidth in the second channel and a respective available bandwidth in a third channel of the perceptual bandwidth of the first user.

8. A system comprising:
a memory having computer-readable instructions; and
one or more processors for executing the computer-readable instructions, the computer-readable instructions comprising:
receiving a base visualization comprising first data in a first set of channels, wherein each channel in the first set of channels is associated with a respective range in the base visualization;
detecting that the respective ranges of the first set of channels fall outside a perceptual bandwidth of a first user, the perceptual bandwidth of the first user previously determined based at least in part on a result of a bandwidth test implemented by a calibration engine to measure a range of perception of the first user with respect to a plurality of senses including measuring a plurality of aspects of at least one of the plurality of senses based at least in part on input from the first user; and
automatically transforming the base visualization to a second visualization, based on the perceptual bandwidth of the first user, wherein the second visualization comprises second data in a second set of channels, wherein each channel in the second set of channels is associated with a respective range in the second visualization,
the respective ranges of the second set of channels falling within the perceptual bandwidth of the first user.

9. The system of claim 8, the computer-readable instructions further comprising receiving iterative feedback from the first user and from a second user to further transform the second visualization into a new visualization, wherein the base visualization fits into the perceptual bandwidth of the second user.

10. The system of claim 8, the computer-readable instructions further comprising:
detecting an environmental factor; and
adjusting the perceptual bandwidth of the first user based on the environmental factor.

11. The system of claim 8, the computer-readable instructions further comprising:
detecting a bandwidth of an output device; and
adjusting the perceptual bandwidth of the first user based on the bandwidth of the output device.

12. The system of claim 8, wherein the automatically transforming the base visualization to the second visualization comprises porting an input stream, comprising a first channel of the base visualization, to an output stream of the second visualization, wherein the output stream comprises a second channel distinct from the input stream.

13. The system of claim 12, wherein the porting the input stream to the output stream comprises compressing the first channel of the base visualization to fit within an available bandwidth of the second channel in the perceptual bandwidth of the first user.

14. The system of claim 12, wherein the porting the input stream to the output stream comprises splitting the first channel across a respective available bandwidth in the second channel and a respective available bandwidth in a third channel of the perceptual bandwidth of the first user.

15. A computer-program product for generating a visualization for a user, the computer-program product comprising a computer-readable storage device having program instructions embodied therewith, the program instructions executable by a processor to cause the processor to perform a method comprising:

receiving a base visualization comprising first data in a first set of channels, wherein each channel in the first set of channels is associated with a respective range in the base visualization;

detecting that the respective ranges of the first set of channels fall outside a perceptual bandwidth of a first user, the perceptual bandwidth of the first user previously determined based at least in part on a result of a bandwidth test implemented by a calibration engine to measure a range of perception of the first user with respect to a plurality of senses including measuring a plurality of aspects of at least one of the plurality of senses based at least in part on input from the first user; and automatically transforming the base visualization to a second visualization, based on the perceptual bandwidth of the first user, wherein the second visualization comprises second data in a second set of channels, wherein each channel in the second set of channels is associated with a respective range in the second visualization, the respective ranges of the second set of channels falling within the perceptual bandwidth of the first user.

16. The computer-program product of claim 15, the method performed by the processor further comprising receiving iterative feedback from the first user and from a second user to further transform the second visualization into a new visualization, wherein the base visualization fits into the perceptual bandwidth of the second user.

17. The computer-program product of claim 15, the method performed by the processor further comprising:
detecting an environmental factor; and
adjusting the perceptual bandwidth of the first user based on the environmental factor.

18. The computer-program product of claim 15, the method performed by the processor further comprising:
detecting a bandwidth of an output device; and
adjusting the perceptual bandwidth of the first user based on the bandwidth of the output device.

19. The computer-program product of claim 15, wherein the automatically transforming the base visualization to the second visualization comprises porting an input stream, comprising a first channel of the base visualization, to an output stream of the second visualization, wherein the output stream comprises a second channel distinct from the input stream.

20. The computer-program product of claim 19, wherein the porting the input stream to the output stream comprises compressing the first channel of the base visualization to fit within an available bandwidth of the second channel in the perceptual bandwidth of the first user.

* * * * *